(12) United States Patent
Henderson et al.

(10) Patent No.: US 6,844,896 B2
(45) Date of Patent: Jan. 18, 2005

(54) MODIFICATION OF COLUMN FIXED PATTERN COLUMN NOISE IN SOLID STATE IMAGE SENSORS

(75) Inventors: Robert Henderson, Edinburgh (GB); Stewart Gresty Smith, Edinburgh (GB); Jonathan Ephriam David Hurwitz, Edinburgh (GB)

(73) Assignee: STMicroelectronics Limited, Buckinghamshire (GB)

( * ) Notice: Subject to any disclaimer, the term of this patent is extended or adjusted under 35 U.S.C. 154(b) by 680 days.

(21) Appl. No.: 09/932,822

(22) Filed: Aug. 17, 2001

(65) Prior Publication Data

US 2002/0051067 A1 May 2, 2002

(30) Foreign Application Priority Data

Aug. 18, 2000 (GB) .............................. 0020280

(51) Int. Cl.[7] .............................................. H04N 5/217
(52) U.S. Cl. ........................ 348/241; 348/308; 348/248
(58) Field of Search ........................... 348/207.99, 241, 348/242, 248, 249, 250, 294, 302, 308, 311, 608; 327/344

(56) References Cited

U.S. PATENT DOCUMENTS 4,502,076 A * 2/1985 Cluniat et al. .............. 348/608
5,790,191 A   8/1998 Zhang
6,570,432 B2 * 5/2003 Denison ..................... 327/344
2002/0154233 A1 * 10/2002 Yoshimura et al. ......... 348/308

FOREIGN PATENT DOCUMENTS

| GB | 2318473 | 4/1998 | .......... H04N/5/217 |
| WO | 99/16238 | 4/1999 | ............ H04N/3/15 |
| WO | 99/66709 | 12/1999 | ............ H04N/3/00 |

* cited by examiner

Primary Examiner—Tuan Ho
(74) Attorney, Agent, or Firm—Lisa K. Jorgenson; Allen, Dyer, Doppelt, Milbrath & Gilchrist, P.A.

(57) ABSTRACT

Solid state image sensors, and methods of operation thereof, includes an array of photosensitive pixels arranged in rows and columns and in which pixel data signals are read out from the pixels via column circuits, which introduces column fixed pattern noise to the signals. The signals are selectively inverted at the inputs to the column circuits and the inversion is reversed following output from the column circuits. Each column circuit may include an analog-to-digital converter and a digital inverter for inverting digital output therefrom. The selective inversion may be applied to alternate rows or groups of rows of the pixel data, and may be applied differently to different frames of the pixel data. These techniques result in column fixed pattern noise being modulated in a manner which makes the noise less apparent to the eye, and which facilitates subsequent cancellation of the noise.

39 Claims, 7 Drawing Sheets

MODIFICATION OF COLUMN FIXED PATTERN COLUMN NOISE IN SOLID STATE IMAGE SENSORS

FIELD OF THE INVENTION

The present invention relates to techniques for reducing the effects of column fixed pattern noise in solid state image sensors of the type comprising a matrix of photoelectric conversion elements. The techniques of the invention result in column fixed pattern noise being modulated in a manner which makes the noise less apparent to the eye and which facilitates subsequent cancellation of the noise.

BACKGROUND OF THE INVENTION

In an image sensor of this general type, the pixels are arranged in rows and columns and each pixel has a read switch which connects the pixel to a vertical line. Horizontal control lines activate the read switches of a row of pixels. These lines are pulsed in sequence to read the light dependent pixel voltages onto the vertical lines. A vertical shift register or decoder is commonly used to generate the read pulse sequence. The voltages on the vertical column lines then pass through a set of elements, one per column, which process the pixel output signals. Typical operations performed by the column elements include storage, amplification, buffering, analog-digital (AD) conversion sampling and comparison.

The column elements add noise in the form of offset voltages to the pixel voltages. The offsets added by each column element vary randomly from column element to column element. Substantially the same offset is applied to each pixel in a given column. This results in vertical shading of the output image, known as "column fixed pattern noise" (column FPN). The main sources of the offsets are mismatches in the charge injection of the sampling switches and amplifier offsets.

Column FPN can be removed by calibrating the image sensor to compensate for the offsets which give rise to column FPN. The sensor is calibrated by applying a known voltage to the inputs of each column element. The resulting column outputs allow the offset for each column to be measured and stored. The measured offsets can subsequently be subtracted from the pixel outputs by analog or digital means. The calibration operation can be performed once per line or once per field. If it is performed once per line, it reduces the time available for pixel conversion. If it is performed once per field, then care must be taken that random thermal noise does not affect the results and that calibration is not influenced by effects not present during normal pixel readout. Such techniques necessarily increase the cost of the sensors.

Solid state image sensors are commonly combined with an analog-to-digital conversion (ADC) function. Two ADC architectures are in common use in CMOS image sensors: per-chip ADC and per-column ADC. In the former, a single high-speed ADC is used to convert all column pixel outputs downstream of the column elements. In the latter, a low speed ADC is incorporated into each column, suitably as part of the column element, so that the analog values of each pixel output voltage of each row are converted in parallel.

FIG. 1 illustrates a conventional per-chip ADC solid state image sensor architecture, comprising a matrix of pixels 10, associated read switches 12, a vertical shift register (decoder) 14, column element circuits 16 and a horizontal shift register (decoder) 18. A 3×3 matrix is shown for the purposes of illustration, wherein the actual matrix would normally be much larger.

An analog readout bus 20 is connected to the single ADC 22. The ADC may be external (off-chip), in which case the analog pixel signals must be driven off-chip, which often requires extra buffering. Alternatively, the ADC may be integrated on-chip with the rest of the sensor, improving speed and power consumption and reducing overall cost. The column elements 16 typically comprise storage capacitors, buffer amplifiers and access switches driven by the horizontal decoder 18. The storage elements hold the pixel voltages ready for conversion by the ADC 22. Buffer amplifiers are required to drive the readout bus 20 and ADC input capacitance. Charge injection of the sampling switches and amplifier offset both contribute to column FPN.

FIG. 2 illustrates a conventional per-column ADC solid state image sensor architecture, again comprising a matrix of pixels 10, read switches 12, a vertical decoder 14, column element circuits 24, incorporating per-column ADC, and a horizontal decoder 18. A digital readout bus 26 provides the sensor output. The column elements 24 include ADC elements, typically comprising sampling capacitors, a reference voltage input (REF), a comparator and digital storage elements. The storage elements hold the pixel voltages for comparison with the reference by the comparator. Charge injection of the sampling switches and amplifier offset again contribute to column FPN.

SUMMARY OF THE INVENTION

In view of the foregoing background, an object of the present invention to provide improved techniques for cancelling column FPN in solid state image sensors, which does not add significantly to the cost of the sensor and which are suitable for implementation in CMOS-type image sensors.

The invention is preferably applicable to image sensors employing per-column ADC. Per-column ADC architectures have advantages of low power, low voltage operation. They have low input-referred noise due to the use of low bandwidth amplifying elements. They are also very flexible for easily configuring new image array dimensions.

In accordance with a first aspect of the invention, there is provided a method of operating a solid state image sensor of the type comprising an array of photosensitive pixels arranged in rows and columns and in which pixel data signals are read out from the pixels via column circuits which introduce column fixed pattern noise to the signals. The method comprises the steps of selectively inverting the signals input to the column circuits, and reversing the inversion following output from the column circuits.

In preferred embodiments, each column circuit includes an analog-to-digital converter and a digital inverter for selectively inverting digital output from the analog-to-digital converter.

In certain embodiments, the selective inversion is applied to alternate rows of the pixel data. In other embodiments, the selective inversion is applied to alternate groups of rows of the pixel data, particularly alternate pairs of rows of the pixel data.

In certain embodiments, the selective inversion is applied differently to different frames of the pixel data. For example, a first selective inversion scheme is applied to alternate frames and a second selective inversion scheme opposite to the first selective inversion scheme is applied to intervening frames.

In certain embodiments, the method preferably further includes the step of selectively switching outputs from adjacent columns between adjacent column output channels prior to the selective inversion of the signals input to the column circuits.

In accordance with a second aspect of the invention, there is provided a solid state image sensor of the type comprising an array of photosensitive pixels arranged in rows and columns and in which pixel data signals are read out from the pixels via column circuits which introduce column fixed pattern noise to the signals. The solid state image sensor comprises means for selectively inverting the signals input to the column circuits, and means for reversing the inversion following output from the column circuits.

In certain embodiments, the means for selectively inverting the signals includes a first chopping circuit included in each column at the input to each column circuit.

Where the sensor is of the active pixel type in which pixel signal voltages and reset voltages are input to the column circuits, the means for selectively inverting the signals input to the column circuits may comprise switch means and control means associated therewith for sampling the pixel signal voltages and reset voltages.

Preferably, the means for reversing the inversion comprises at least one output chopper circuit. In certain embodiments, each column of the array includes an output chopper circuit.

In particularly preferred embodiments of the invention, each column circuit includes analog-to-digital conversion means and the output chopper circuit comprises digital inversion means.

Preferably, the selective inversion and re-inversion is controlled by a common chopping signal.

In certain embodiments, the sensor further includes means for selectively switching outputs from adjacent columns between adjacent column output channels prior to the means for selectively inverting the signals input to the column circuits.

In accordance with a third aspect of the invention, there is provided an imaging system incorporating a solid state image sensor in accordance with the second aspect of the invention.

In accordance with a fourth aspect of the invention, there is provided a camera incorporating a solid state image sensor in accordance with the second aspect of the invention.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
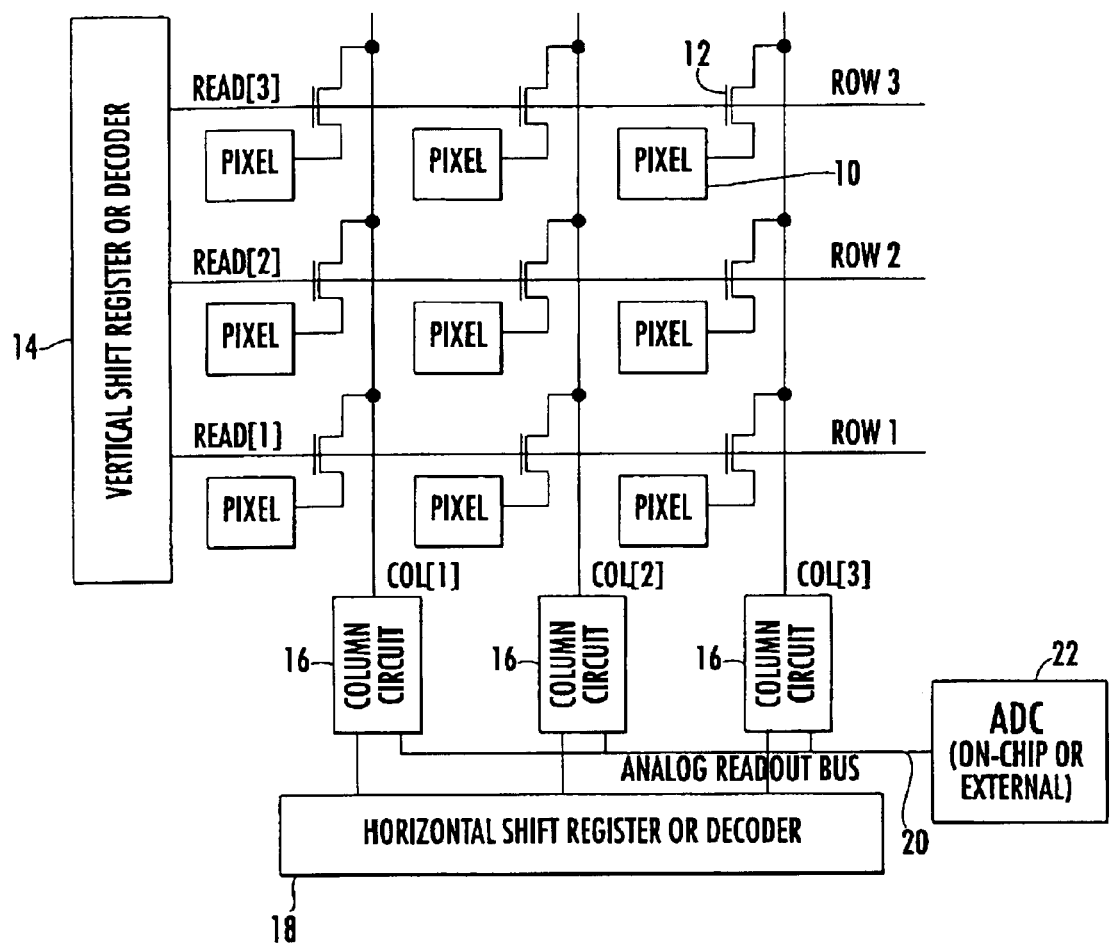
FIG. 1 illustrates a conventional solid state image sensor having a per-chip ADC architecture according to the prior art.
Figure 3:
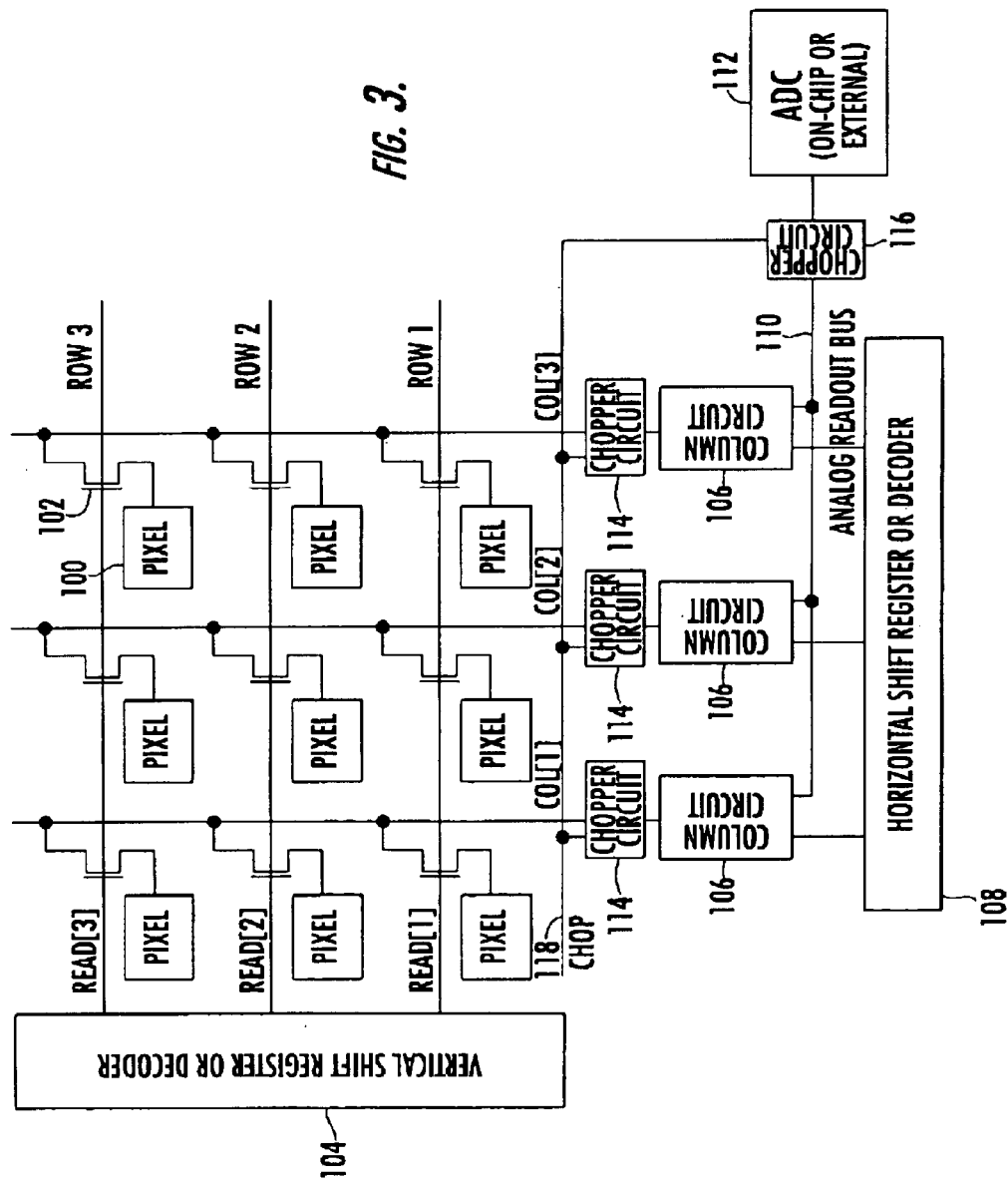
FIG. 3 illustrates an embodiment of a solid state image sensor having a per-chip ADC architecture in accordance with the present invention.

Referring now to the drawings, FIG. 3 shows an embodiment of a solid state image sensor with a per-chip ADC architecture, similar to that of FIG. 1, but modified to implement a column FPN reduction technique in accordance with the present invention. As in FIG. 1, the sensor comprises a matrix of pixels 100, associated read switches 102, a vertical shift register (decoder) 104, column element circuits 106, a horizontal shift register (decoder) 108, analog readout bus 110 and ADC 112. In addition, each column includes a first chopper circuit 114 upstream of the respective column element 106, and the readout bus 110 includes a second chopper circuit 116 downstream of the column elements 106 and prior to the ADC 112. The operation of the chopper circuits 114 and 116 is controlled by a common CHOP signal line 118.

Figure 4:
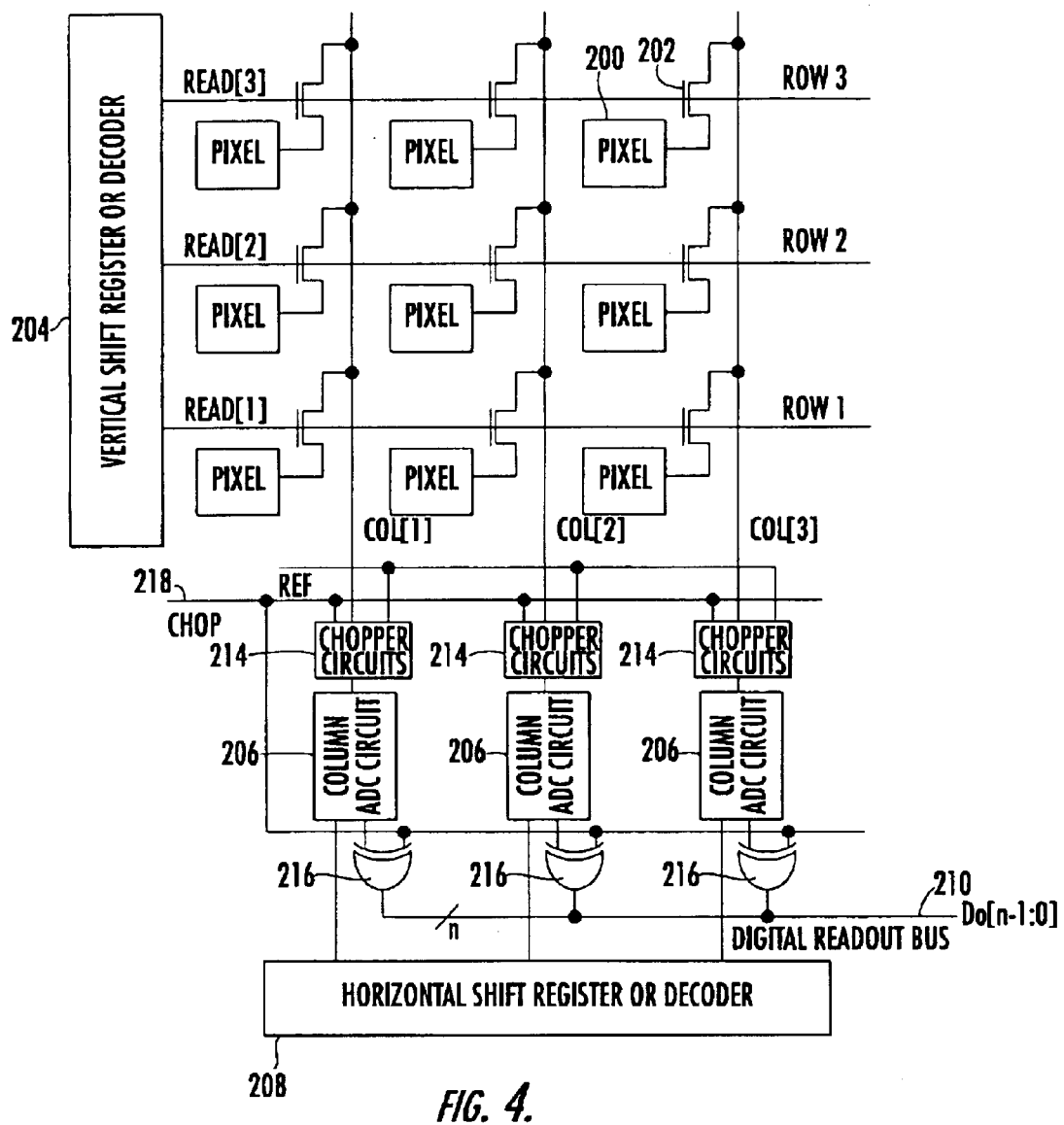
FIG. 4 illustrates an embodiment of a solid state image sensor having a per-column ADC architecture in accordance with a particularly preferred embodiment of the present invention.

FIG. 4 shows a preferred embodiment of a solid state image sensor with a per-column ADC architecture, similar to that of FIG. 2, but again modified to implement a column FPN reduction technique in accordance with the present invention. As in FIG. 3, the sensor comprises a matrix of pixels 200, associated read switches 202, a vertical shift register (decoder) 204, column element circuits 206 incorporating ADC means, a horizontal shift register (decoder) 208 and digital readout bus 210. In addition, each column includes a first chopper circuit 214 upstream of the respective column element 206, and a second chopper element 216 downstream of the respective column element 206. That is, chopper circuits 214, 216 are added to the inputs and outputs of the column ADC circuits 206. The operation of the chopper circuits 114 and 116 is controlled by a common CHOP signal line 218.

The function and operation of the chopper circuits/elements 114, 116, 214, 216, etc. of the present invention will now be described in more detail.

Figure 2:
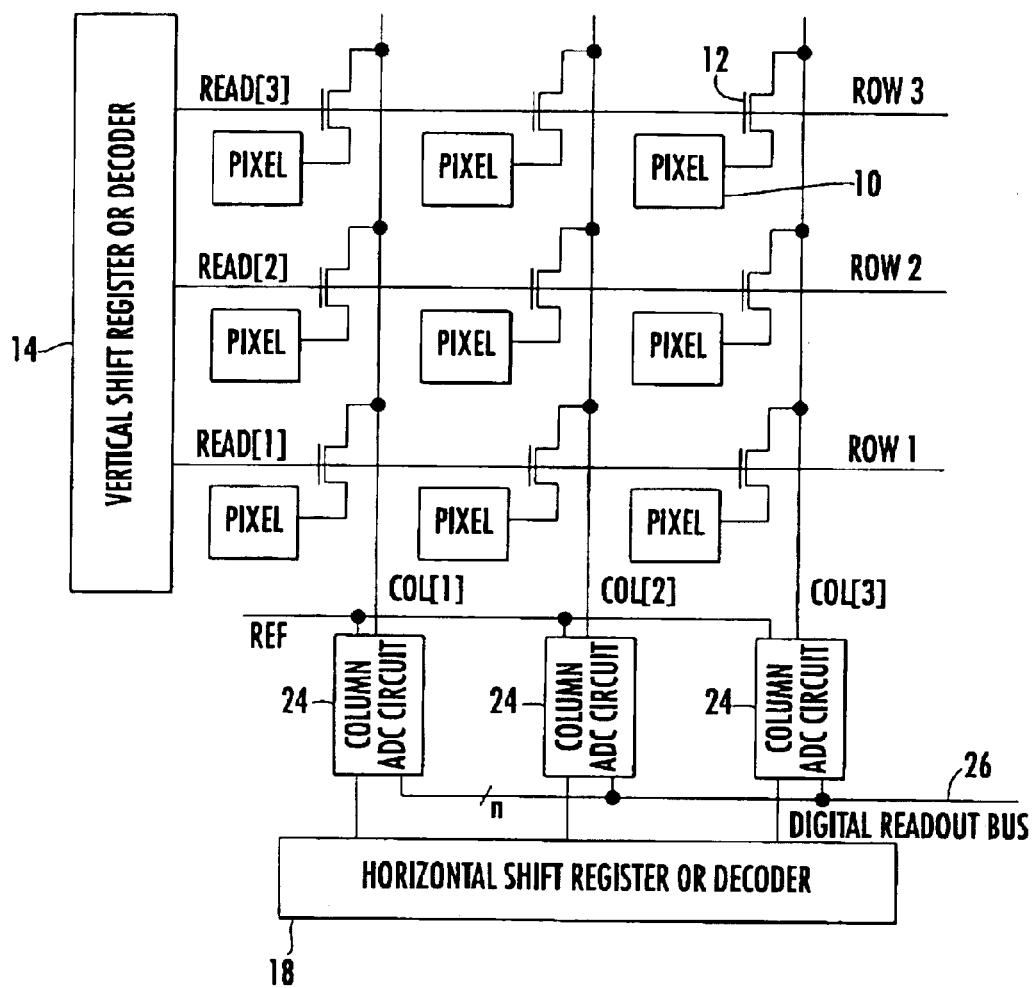
FIG. 2 illustrates a conventional solid state image sensor having a per-column ADC architecture according to the prior art.
Figure 7:
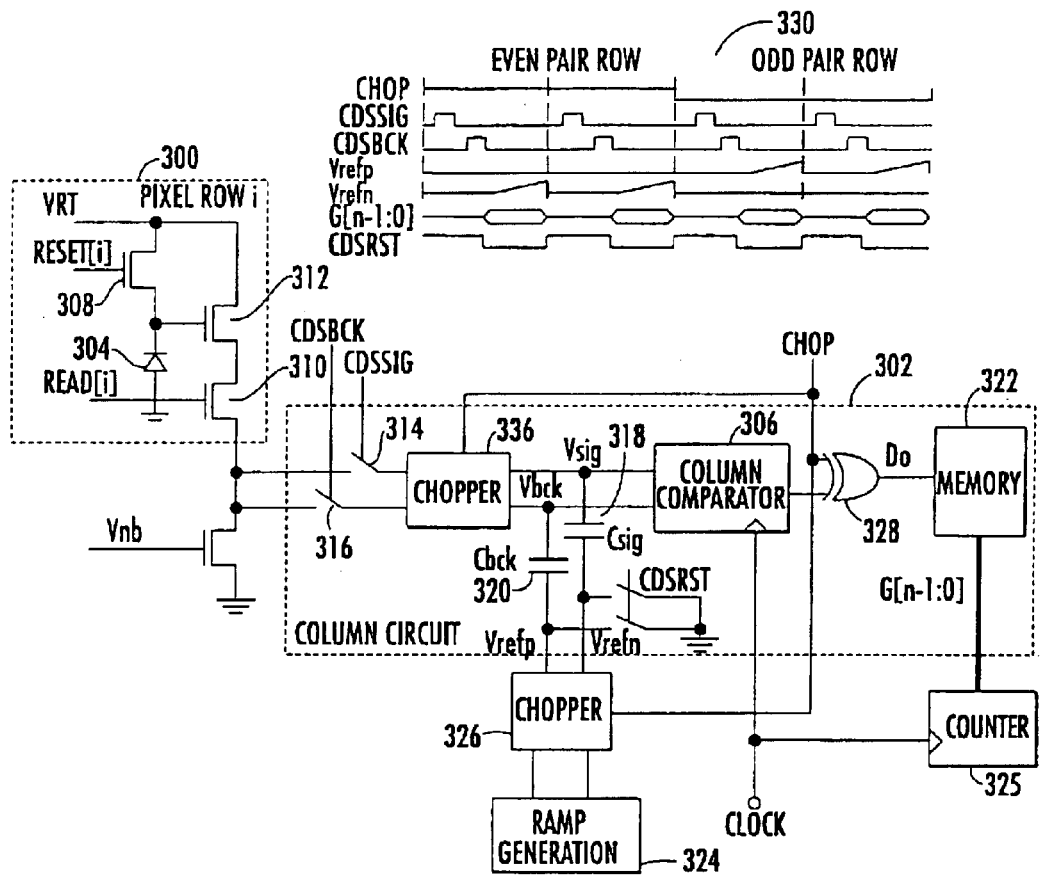
FIG. 7 illustrates a further preferred embodiment of a circuit for implementing column FPN reduction in accordance with the present invention.

Referring first to FIG. 7, there is shown a preferred implementation of the present invention as applied to each column of a prior art sensor such as that of FIG. 2, (i.e., having a per-column ADC architecture). FIG. 7 shows one pixel 300 of a plurality of pixels which together make up one column of a sensor array, and a column circuit 302. The pixel 300 in this case is an active three-transistor type, comprising a photodiode 304, a reset switch transistor 308, a read switch transistor 310 and an amplifying transistor 312, as is well know in the art. As previously noted, the decoder (vertical and horizontal shift registers 14, 16 of FIG. 2) allows selective reset of a row of pixels from a reference voltage (VRT) and subsequent a read of the light-dependent pixel output voltages.

In the horizontal direction each of the column circuits provides an ADC function which together convert a row of pixel output voltages to digital form. Each individual column circuit 302 includes a pair of switches 314, 316 to control sampling of the pixel signal voltage (Vsig) and the reset voltage (Vbck) respectively onto a pair of storage capacitors 318 (Csig) and 320 (Cbck). One capacitor 318 samples the pixel signal voltage and the other capacitor 320 samples the pixel reset voltage. The technique of subtracting a pixel signal voltage from pixel reset voltage is called Correlated Double Sampling (CDS) and removes low frequency pixel noise. The column ADC circuit converts the resulting differential voltage into an n-bit binary representation Do [n−1:0]. Preferably, a chopper 336 is placed after the switches 314, 316 in order that charge injection mismatch contribution from the column FPN is also modulated.

The switches 314, 316 are controlled by control signals (CDSSIG and CDSBCK) which are activated once per row to store the output voltages of the row of pixels currently being read. The sampling capacitors 318, 320 present their stored voltages to a comparator 306 whose output controls the access switches of a register of memory elements 322. An addressable decoder allows selective reading of the memory elements 322.

At the digital output of the column ADC element, the inversion must operate on logic states. The output chopper circuit 328 can be formed by a two-input exclusive-OR function, with one of the inputs connected to the logic output from comparator 306 and the other connected to CHOP. This operation must be performed on each output bit from the ADC.

The ADC circuit converts the input differential voltage to binary form by comparing it to a differential reference voltage (Vrefp−Vrefn). The reference voltages Vrep and Vrefn are generated by a single reference generator 324 and distributed to all column ADC circuits. These reference voltages must also pass through a chopper circuit 326.

In the preferred embodiment of FIG. 7, sampling CDSRST connects the bottom plates of capacitors 318 and 320 to ground. Then, switches 314 and 316 sample the signal and reset voltages of the pixel. Subsequently, ADC is performed, CDSRST is released, and a ramp voltage is applied to capacitor 318. During the ramp, a clock operates the comparator 306 which has the function Do=0 when (Vbck−Vsig)>(Vrefp−Vrefn) and Do=1 otherwise. During this time a digital counter 325 increments. When the comparator 306 changes state from Do=0 to D0=1, the memory 322 records the present state of the counter 325.

The digital code is then a representation of the voltage at the column input. The application of CHOP=0 causes the capacitors 318 and 320 to sample signal voltages and the ramp is now applied to capacitor 320. The output bit state is inverted by the exclusive-OR gate change. The system operates as before, however the comparator offset has been inverted by the application on each video line pair by the action of the chopper.

Column FPN is introduced by mismatches in the column ADC and sampling elements. It has the effect of adding an offset voltage Vfpn to each column differential voltage (Vsig−Vbck+Vfpn). The voltages Vfpn are randomly distributed across the array and their contributions appear as shaded vertical lines in the output image. The main sources of offset are mismatches in the charge injection of the sampling switches and amplifier offsets.

In the embodiment of FIG. 7, modulation of column FPN is accomplished as follows. The phases of the control signals CDSSIG and CDSBCK for the switches 314 and 316 are interchanged after every pair of lines. On odd pair rows operation is as normal. That is, the pixel signal voltage Vsig is stored on the first storage capacitor 318 and the reset voltage Vbck is stored on the second storage capacitor 320. On even pair rows this phase interchange has the effect of storing the pixel reset voltage Vbck on the first storage capacitor 318 and the pixel signal voltage Vsig on the second storage capacitor 320. That is, the differential voltage presented to the comparator 306 is inverted while the offsets remain in the same sense: (Vbck−Vsig+Vfpn).

In addition, the chopper circuit or multiplexer 326 at the output of the ramp generator 324 inverts the sense of reference ramp voltage Vrmp on even pair rows. Since both the signal and reference are inverted at the ADC element input, the ADC output is also inverted and now produces a one-to-zero transition when the ramp voltage Vrmp exceeds the pixel differential voltage. The ADC output is inverted by second chopper circuit 328 after every even row pair to maintain consistent operation of the memory element 322 and GCC. The AD conversion thus provides a digital representation of the value (Vsig−Vbck+Vfpn) on odd pair rows and (Vbck−Vsig+Vfpn) on even pair rows. This has the effect of modulating the column FPN to a high frequency which can be corrected during subsequent color reconstruction of the image sensor output signal. The inverting or "chopping" action is performed on a row pair basis to avoid corrupting color information from the Bayer pattern color filter array of the sensor.

The various inversion operations are controlled by a CHOP signal. FIG. 7 shows a timing diagram 330 illustrating the CHOP signal and the corresponding phase inversion of the control signals CDSSIG and CDSBCK. The same CHOP signal also controls the operation of the first and second chopper signals as described above.

The embodiment of FIG. 7 also makes it possible to vary the chopping action on a frame-by-frame basis, e.g., to chop on even row pairs on even frames and on odd row pairs on odd frames. In this manner, the fixed pattern noise offset on any given pixel changes sign from frame to frame. In a 30 frame-per-second (fps) sensor, all pixels would thus exhibit a 15 fps cyclic FPN inversion. Averaging in the retina of the viewer's eye will then help to attenuate the apparent FPN.

In a monochrome camera, it is possible to chop on a row-by-row basis so as to obtain a high frequency noise pattern which is less noticeable to the eye. A noise pattern of this type may be acceptable in high-resolution monochrome images without the need for additional correction, representing a saving in hardware for single-chip video cameras.

The present invention is applicable to all solid-state image sensors having a matrix of photosensitive elements (pixels), typically photodiodes, and is particularly applicable to such sensors implemented using CMOS technology.

The invention may be implemented in other ways, besides that described above with reference to FIG. 7. In general terms, the invention requires a chopping action to be applied to the inputs and outputs of the column circuits of conventional image sensors such as those of FIGS. 1 and 2, as illustrated in FIGS. 3 and 4. The "input" choppers (114 and 214 in FIGS. 3 and 4) have the function of inverting the polarity (or logic state) of the input signal while the "output" choppers (116, 216 in FIGS. 3 and 4) invert the polarity (or logic state) of the output signal, both under the control of the CHOP timing signal.

In these examples, when CHOP is high no inversion is performed and when CHOP is low the signal polarity is inverted. If the function of the column circuits (106 and 206 in FIGS. 2 and 3) is considered to be linear (gain and/or delay) with additive offset noise, then the periodic inversion only affects the offset. That is, the inversion of the input signal by the input choppers is reversed by the output choppers, while the offset noise, which arises within the column circuits, is inverted once by the output choppers.

The function of the conventional column circuits can be represented generically as:

$$V_o(t)=V_i(t)gz^{-1}+V_{off}$$

where $V_o(t)$ is the column output signal, $V_i(t)$ is the column input signal (equivalent to Vsig–Vbck above), g is a gain, $z^{-1}$ is a delay and $V_{off}$ is an offset (equivalent to Vfpn above). If the input and output are multiplied by the function s(t)=1 when CHOP=1 and s(t)=0 when CHOP=0, then:

$$V_o(t)=V_i(t)gz^{-1}s(t)s(t)+V_{off}s(t)$$

which is equivalent to:

$$V_o(t)=V_i(t)gz^{-1}+V_{off}s(t)$$

since s(t)*s(t)=1. This demonstrates that the effect of chopping is to invert only the offset term while the signal and the transfer function of the column circuit remain unchanged. The signal being processed should be considered to be the difference between the ADC reference voltage and the pixel output voltage. A chopper circuit is required on both reference and pixel outputs.

As discussed above, for Bayer pattern color sensors the CHOP signal should remain high on even pair lines and should remain low on odd pair lines. This is to preserve offsets on Bayer color cells which occur on a two-pixel repetition pattern in the horizontal and vertical directions. The chopped image can pass through color processing without the noise information affecting color reconstruction. The chopped offset noise component can be removed at a later stage by techniques such as spatial low-pass filtering, etc.

As noted above, further improvements can be gained by varying the chopping action on a frame-by-frame basis. For example, by setting CHOP high on even row pairs and low on odd row pairs for even frames, and low for even row pairs/high for odd row pairs on odd frames, the offset noise component for any given pixel changes polarity from frame to frame. In a high frame-rate application, an averaging between successive frames will take place in the retina of the viewer's eye which will attenuate the apparent FPN noise amplitude which, in certain cases, may present the need for further FPN cancellation steps.

As also noted above, for monochrome image sensors, the CHOP signal should be set high on even lines and low on odd lines. The resulting noise pattern can be corrected in a similar way as for Bayer type color sensors. However, the noise pattern has a higher spatial frequency since it is based on a single row cycle rather than a two-row cycle. The noise pattern is thus less noticeable to the eye and further FPN correction may not be necessary.

An advantage of the invention is that the offset noise information is modulated to a high spatial frequency where it is no longer correlated with the image. The offset information is therefore present in the image data in a form in which it can be selectively removed without degrading image quality. Prior art techniques of column FPN noise cancellation require special calibration cycles to be performed which slow down sensor operation. A further disadvantage of prior art techniques is that other noise sources may be present during calibration, which are not present during image read-out. These can cause new noise to be introduced by the compensation procedure.

Figure 5:
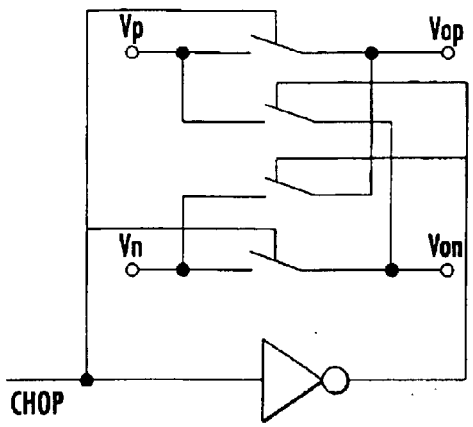
FIG. 5 illustrates a chopper circuit for use in accordance with the present invention.

The present invention requires a small amount of additional hardware per column in the form of the chopper circuits 114, 116, etc. at the inputs and outputs of the conventional column circuits 106, etc. However, the chopper circuits may be very straightforward. One example for differential signals (Vp–Vn) is illustrated in FIG. 5, comprising a set of four switches controlled by the CHOP signal as shown to provide chopped output signals Vop and Von. The differential output is (Vp–Vn) when CHOP is high and (Vn–Vp) when CHOP is low.

For active pixel sensors, Vp and Vn represent the pixel signal voltage Vsig and reset voltage Vbck as described above. These signals are stored on two sampling capacitors at two different sampling instants to allow resetting of the pixel. They are later subtracted to remove low frequency pixel noise using correlated double sampling (CDS). In this case, as described in relation to FIG. 7, no additional chopping switches are needed at the input to the conventional column circuit, since the necessary signal inversion may be achieved by reversing the phasing of the control signals CDSSIG and CDSBCK which control the sampling switches 314 and 316. By removing the need for additional switches, a possible source of charge injection mismatch is avoided.

Figure 6:
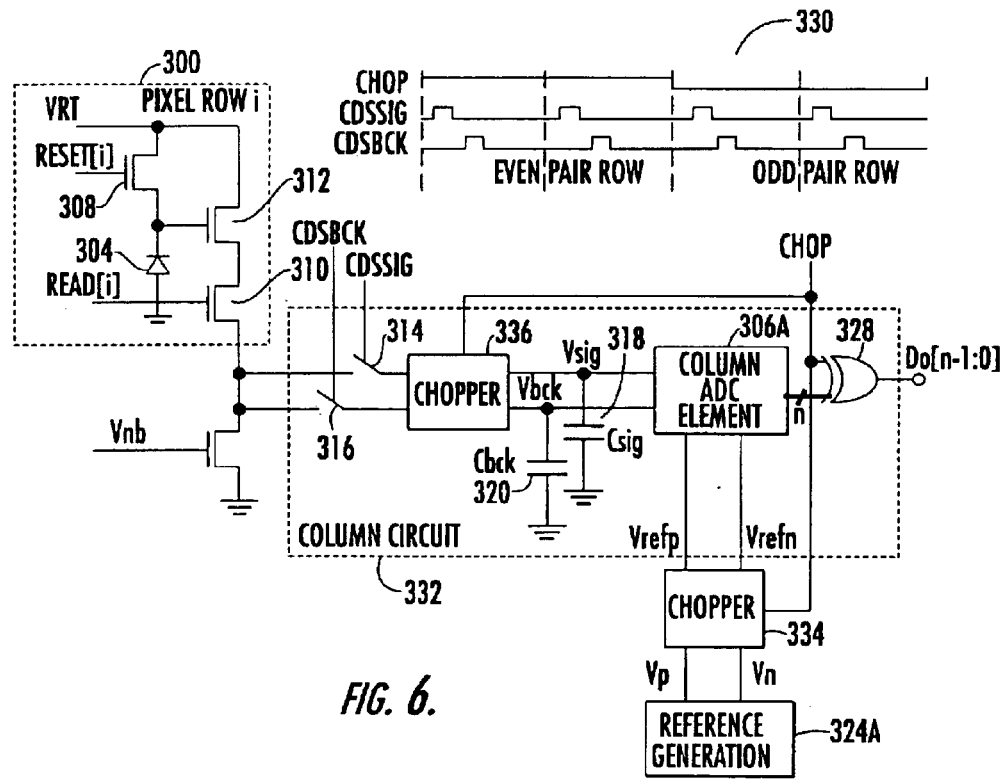
FIG. 6 illustrates one preferred embodiment of a circuit for implementing column FPN reduction in accordance with the present invention.

FIG. 6 shows a generalized embodiment of the implementation illustrated in FIG. 7, where like components are designated by like reference numerals. In this case, the specific column/ADC/chopper architecture of FIG. 7 is replaced by generic ADC circuit 306A and reference generator 324A, and an output chopper circuit 334 such as that of FIG. 5. In the case where per-chip ADC is used, the column output chopper circuits may be removed and replaced by a single output chopper circuit (116 in FIG. 3) at the input to the ADC (112 in FIG. 3).

Figure 8:
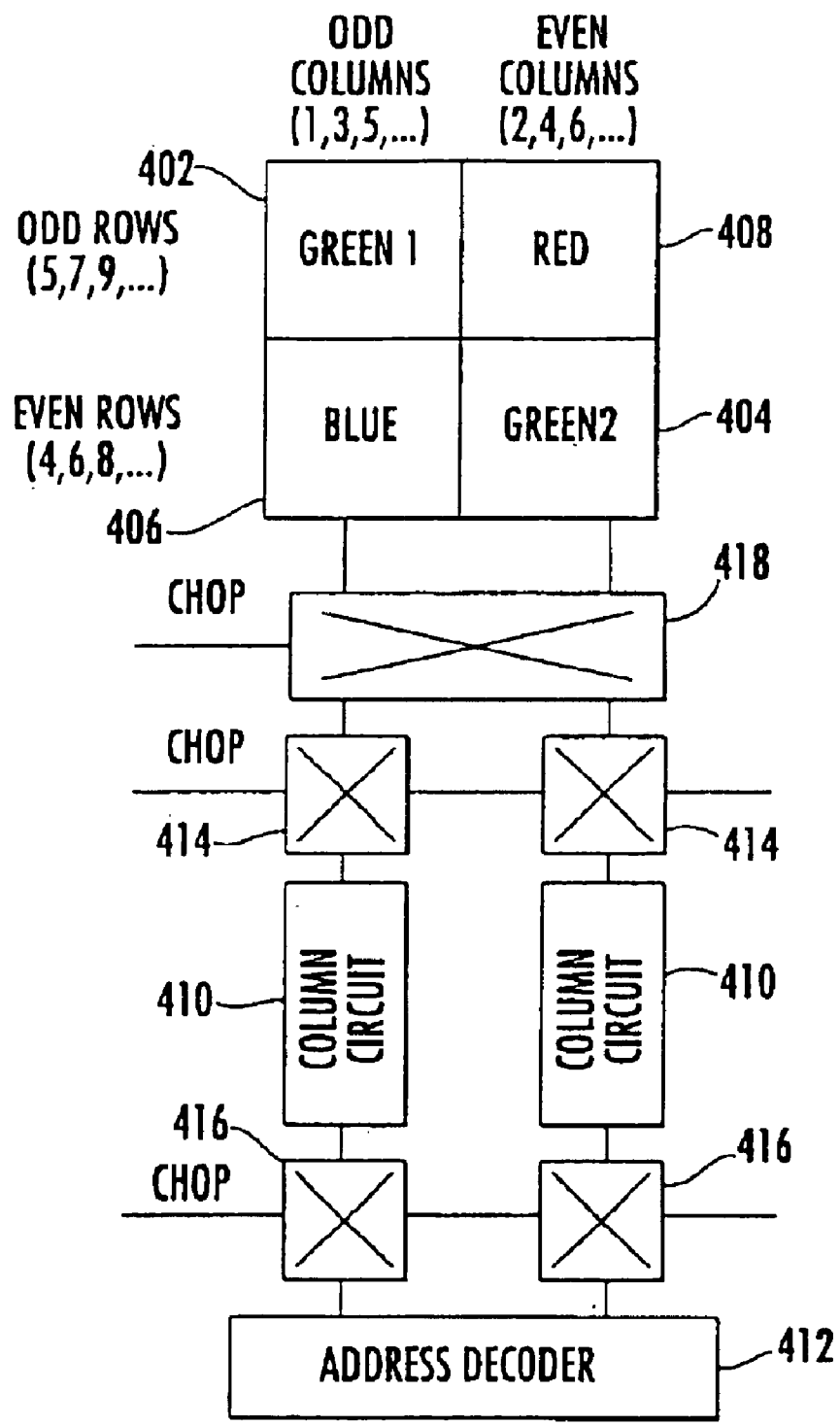
FIG. 8 illustrates an embodiment of a combined column circuit and multiplexer for implementing column FPN reduction in accordance with the present invention.

FIG. 8 shows a further embodiment of the invention applied to a Bayer type sensor. As is well known in the art, a Bayer pattern color sensor array comprises a repeating pattern comprising two pixels 402, 404 of a first color (normally green), one pixel 406 of a second color (normally blue), and one pixel 408 of a third color (normally red) across two rows and two columns. Each column includes a conventional column circuit 410 and signals are read out from the sensor by an address decoder 412.

In this embodiment, each column includes a first chopper circuit 414 at the input to the column circuit 410 and a second chopper circuit 416 at the output from the column circuit, as before. In this case, a further multiplexer/chopper 418 is included for each pair of adjacent columns of the Bayer pattern, between the pixel array column outputs and the first choppers 414, and inter-connecting the adjacent columns, so as to switch the adjacent column outputs in accordance with the value of the CHOP signal.

In this way, successive green channel pixel values from the adjacent columns pass through the same column readout circuit 410 and have exactly opposite polarity offset components. Shuffled color readout techniques can be applied as well as aiding computation during color reconstruction. This embodiment is implemented by adding the further chopper 418, crossing the adjacent columns, to the previously described chopped column circuits. Shuffled readout can then be applied to read out all odd then all even columns by addressing the column decoder 412 appropriately. This ensures that all green pixel data from each pair of columns passes through the same column circuitry and is grouped in time.

It will be understood that the present invention modifies column FPN noise components in output image data in such a manner that, in certain applications, the column FPN noise is "disguised" to such an extent that further FPN cancellation is unnecessary, and also simplifies the subsequent cancellation of column FPN where this is required.

Image sensors embodying the present invention may be incorporated in a variety of types of imaging systems and cameras. Improvements and modifications may be incorporated without departing from the scope of the invention.

That which is claim is:

1. A method of operating a solid state image sensor comprising an array of photosensitive pixels arranged in rows and columns and in which pixel data signals are read therefrom via corresponding column circuits that introduce column fixed pattern noise to the pixel data signals, the method comprising:
    selectively inverting the pixel data signals being input to the column circuits; and
    reversing the inversion of the inverted pixel data signals following output from the column circuits.

2. A method according to claim 1, wherein each column circuit comprises:
    an analog-to-digital converter; and
    a digital inverter connected to said analog-to-digital converter for selectively inverting digital output signals therefrom.

3. A method according to claim 1, wherein the selectively inverting is applied to alternate rows of the pixel data signals.

4. A method according to claim 1, wherein the selectively inverting is applied to alternate groups of rows of the pixel data signals.

5. A method according to claim 4, wherein the selectively inverting is applied to alternate pairs of rows of the pixel data signals in the alternate groups of rows.

6. A method according to claim 1, wherein the selectively inverting is applied differently to different frames of the pixel data signals.

7. A method according to claim 6, wherein the selectively inverting comprises:
    applying a first selective inversion scheme to alternate frames; and
    applying a second selective inversion scheme opposite to the first selective inversion scheme to intervening frames.

8. A method according to claim 1, further comprising selectively switching outputs from adjacent columns between adjacent column output channels prior to selectively inverting the pixel data signals input to the column circuits.

9. A method of operating a solid state image sensor comprising an array of photosensitive pixels arranged in rows and columns, the method comprising:
    reading pixel data signals from the array of photosensitive pixels via corresponding column circuits; selectively inverting the pixel data signals being input to the column circuits; and
    reversing the inversion of the inverted pixel data signals following output from the column circuits.

10. A method according to claim 9, wherein each column circuit comprises:
    an analog-to-digital converter; and
    a digital inverter connected to said analog-to-digital converter for selectively inverting digital output signals therefrom.

11. A method according to claim 9, wherein the selectively inverting is applied to alternate rows of the pixel data signals.

12. A method according to claim 9, wherein the selectively inverting is applied to alternate groups of rows of the pixel data signals.

13. A method according to claim 12, wherein the selectively inverting is applied to alternate pairs of rows of the pixel data signals in the alternate groups of rows.

14. A method according to claim 9, wherein the selectively inverting is applied differently to different frames of the pixel data signals.

15. A method according to claim 14, wherein the selectively inverting comprises:
    applying a first selective inversion scheme to alternate frames; and
    applying a second selective inversion scheme opposite to the first selective inversion scheme to intervening frames.

16. A method according to claim 9, further comprising selectively switching outputs from adjacent columns between adjacent column output channels prior to selectively inverting the pixel data signals input to the column circuits.

17. A solid state image sensor comprising:
    an array of photosensitive pixels arranged in rows and columns;
    a plurality of column circuits connected to the columns of said array of photosensitive pixels for reading pixel data signals therefrom while introducing column fixed pattern noise to the pixel data signals;
    inverting means for selectively inverting the pixel data signals input to said plurality of column circuits; and
    reversing means for reversing the inversion of the inverted pixel data signals following output from said plurality of column circuits.

18. A solid state image sensor according to claim 17, wherein said inverting means comprises a first chopping circuit at an input of each column circuit.

19. A solid state image sensor according to claim 17, wherein said array of photosensitive pixels comprises active pixels in which pixel signal voltages and reset voltages are input to said plurality of column circuits; and wherein said inverting means comprises switch means and control means associated therewith for sampling the pixel signal voltages and reset voltages.

20. A solid state image sensor according to claim 17, wherein said reversing means comprises at least one output chopper circuit.

21. A solid state image sensor according to claim 20, wherein said at least one output chopper circuit comprises a plurality of output chopper circuits, with each column having an output chopper circuit connected thereto.

22. A solid state image sensor according to claim 21, wherein each column circuit comprises analog-to-digital conversion means; and wherein each output chopper circuit comprises digital inversion means.

23. A solid state image sensor according to claim 17, wherein said inverting means and said reversing means are controlled by a common chopping signal.

24. A solid state image sensor according to claim 17, further comprising switching means for selectively switching outputs from adjacent columns between adjacent column output channels prior to said inverting means selectively inverting the pixel data signals being input to said plurality of column circuits.

25. A solid state image sensor comprising:
    an array of photosensitive pixels arranged in rows and columns;
    a plurality of column circuits connected to the columns of said array of photosensitive pixels for reading pixel data signals therefrom;
    at least one input chopping circuit for selectively inverting the pixel data signals input to said plurality of column circuits; and at least one output chopping circuit for reversing the inversion of the inverted pixel data signals following output from said plurality of column circuits.

26. A solid state image sensor according to claim 25, wherein said at least one input chopping circuit comprises a plurality of input chopping circuits, with an input of each column having an input chopping circuit connected thereto.

27. A solid state image sensor according to claim 25, wherein said array of photosensitive pixels comprises active pixels in which pixel signal voltages and reset voltages are input to said plurality of column circuits; and wherein said at least one chopping circuit comprises at least one switch and a control circuit associated therewith for sampling the pixel signal voltages and reset voltages.

28. A solid state image sensor according to claim 25, wherein said at least one output chopper circuit comprises a plurality of output chopper circuits, with each column having an output chopper circuit connected thereto.

29. A solid state image sensor according to claim 28, wherein each column circuit comprises an analog-to-digital convertor; and wherein each output chopper circuit comprises an invertor.

30. A solid state image sensor according to claim 25, wherein said at least one input and output chopping circuits are controlled by a common chopping signal.

31. A solid state image sensor according to claim 25, further comprising a switching circuit for selectively switching outputs from adjacent columns between adjacent column output channels prior to said at least one input chopping circuit selectively inverting the pixel data signals being input to said plurality of column circuits.

32. An imaging system comprising: a solid state image sensor comprising an array of photosensitive pixels arranged in rows and columns, a plurality of column circuits connected to the columns of said array of photosensitive pixels for reading pixel data signals therefrom, at least one input chopping circuit for selectively inverting the pixel data signals input to said plurality of column circuits, and at least one output chopping circuit for reversing the inversion of the inverted pixel data signals following output from said plurality of column circuits.

33. An imaging system according to claim 32, wherein said at least one input chopping circuit comprises a plurality of input chopping circuits, with an input of each column having an input chopping circuit connected thereto.

34. An imaging system according to claim 32, wherein said array of photosensitive pixels comprises active pixels in which pixel signal voltages and reset voltages are input to said plurality of column circuits; and wherein said at least one input chopping circuit comprises at least one switch and a control circuit associated therewith for sampling the pixel signal voltages and reset voltages.

35. An imaging system according to claim 32, wherein said at least one output chopper circuit comprises a plurality of output chopper circuits, with each column having an output chopper circuit connected thereto.

36. An imaging system according to claim 35, wherein each column circuit comprises an analog-to-digital convertor; and wherein each output chopper circuit comprises an invertor.

37. An imaging system according to claim 32, wherein said at least one input and output chopping circuits are controlled by a common chopping signal.

38. An imaging system according to claim 32, wherein said solid state image sensor further comprises a switching circuit for selectively switching outputs from adjacent columns between adjacent column output channels prior to said at least one input chopping circuit selectively inverting the pixel data signals being input to said plurality of column circuits.

39. An imaging system according to claim 32, wherein the imaging system is configured as a camera.

* * * * *

UNITED STATES PATENT AND TRADEMARK OFFICE
CERTIFICATE OF CORRECTION

PATENT NO. : 6,844,896 B2
DATED : January 18, 2005
INVENTOR(S) : Henderson et al.

It is certified that error appears in the above-identified patent and that said Letters Patent is hereby corrected as shown below:

Column 2,
Line 31, delete "invention to" insert -- invention is to --

Column 4,
Line 54, delete "know" insert -- known --

Column 5,
Line 25, delete "Vrep" insert -- Vrefp --
Line 38, delete "D0=1" insert -- Do=1 --

Column 9,
Line 1, delete "claim" insert -- claimed --
Lines 46-49, delete "reading pixel data signals from the array of photosensitive pixels via corresponding column circuits; selectively inverting the pixel data signals being input to the column circuits; and" insert -- reading pixel data signals from the array of photosensitive pixels via corresponding column circuits;
    selectively inverting the pixel data signals being input to the column circuits; and --

Column 11,
Lines 32-33, delete "An imaging system comprising: a solid state image sensor comprising" insert -- An imaging system comprising:
        a solid state image sensor comprising --

Signed and Sealed this

Twelfth Day of July, 2005

JON W. DUDAS
*Director of the United States Patent and Trademark Office*